FIG. 2
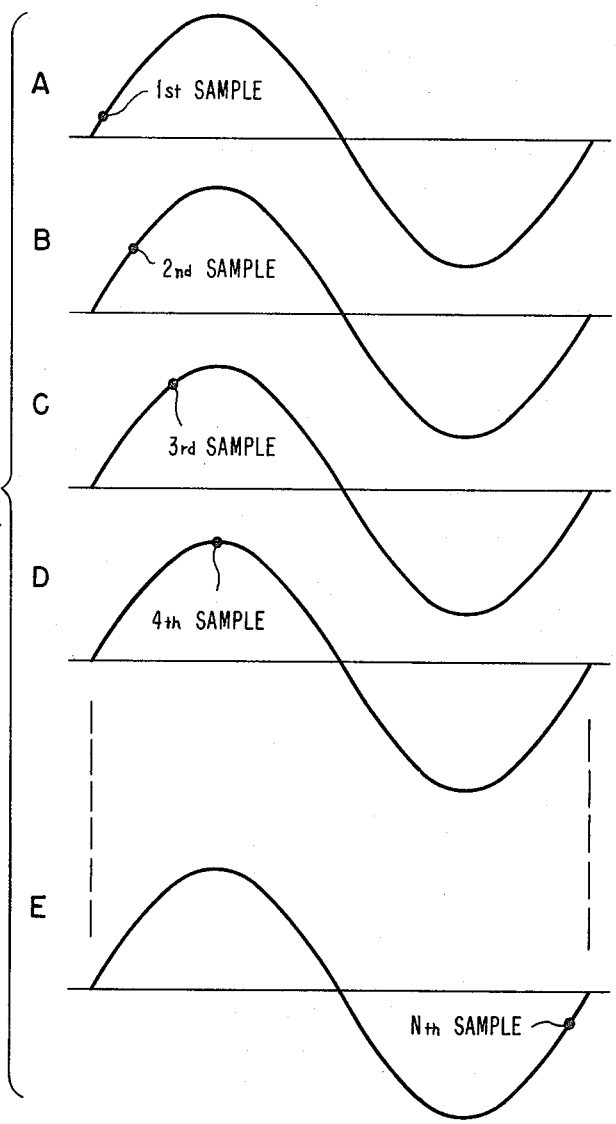
SUCCESSIVE WAVES OF THE SIGNAL TO BE DISPLAYED
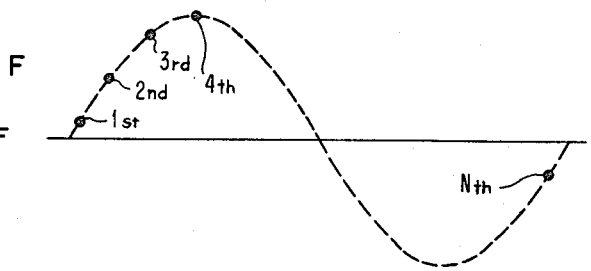
COMPOSITE DISPLAY OF SAMPLES May 31, 1960  A. S. FARBER  2,939,038
FAST RESPONSE OSCILLOGRAPH SYSTEM
Filed May 29, 1959  6 Sheets-Sheet 6

United States Patent Office 2,939,038
Patented May 31, 1960

2,939,038
FAST RESPONSE OSCILLOGRAPH SYSTEM

Arnold S. Farber, New York, N.Y., assignor to International Business Machines Corporation, New York, N.Y., a corporation of New York Filed May 29, 1959, Ser. No. 816,736

14 Claims. (Cl. 315—22)

This invention relates to oscillograph systems for providing visible displays of voltages having high rates of change, and more particularly to oscillograph systems in which many samples of rapidly recurring voltages are taken in order to upwardly extend the response rate which can be displayed with available oscillograph equipment.

In the development, testing and servicing of electrical apparatus, one of the most useful tools has been the oscillograph. Electro-mechanical oscillographs have been quite useful at lower frequencies, and the development of the cathode ray oscilloscope has been particularly useful in radio frequency work.

The various oscillograph devices commonly have vertical deflection circuits to which the unknown signal is applied, and arrangements for establishing a timed horizontal movement to obtain a meaningful visible display of the information carried by the unknown signal. The electro-mechanical oscillographs commonly have a record carrying medium such as photographic paper which is moved at a uniform rate in a horizontal direction in order to provide "sweep." The cathode ray oscilloscopes commonly employ a horizontal sweep circuit for the deflection in a horizontal direction of the cathode ray beam. Such deflection takes place in some integral frequency relationship to the frequency of recurrence of the unknown voltage to be displayed.

Very frequently, the unknown signal is of insufficient voltage amplitude to provide a proper display upon the oscillograph. Accordingly, it is quite common, particularly in cathode ray oscilloscopes, to employ signal amplifiers. Such amplifiers may be provided for the horizontal sweep circuits as well as for the vertical deflection circuits for the unknown signal.

As the electrical and electronic technologies have advanced, signals having higher and higher frequencies with higher rates of change have been employed. Unfortunately, the development and refinement of oscillographs to make them fully sensitive and responsive to ever higher frequencies has not kept pace. Thus, it has not been possible to obtain satisfactory displays of signals in the highest frequency ranges prior to the present invention. These limitations in the response rates of present oscillographs have seriously impaired and limited technical developments in the higher frequency ranges.

The limitations have arisen not only from the frequency limitations of the oscillographs themselves, but also from the limitations of the oscillograph amplifiers. Particularly in the case of the cathode ray oscilloscopes, the upper frequency limitations of the amplifiers have often been a more serious factor than the limitations of the cathode ray tubes themselves. Thus, if no amplification is required, a higher frequency can be displayed than would otherwise be possible. However, the high frequency is often of low voltage amplitude so that greater sensitivity and amplification is required.

Accordingly, it is an object of the present invention to provide a system which very substantialy increases the effective rate of response of an oscillograph.

Another object of the invention is to substantially increase the effective sensitivity of commercial oscillographs at very high frequencies.

Another object of the invention is to provide visual displays of signal frequencies which have previously been considered as beyond the range of known oscillograph equipment.

As indicated above, the cathode ray oscilloscopes as a class are capable of responding to frequencies which are above the range of the electro-mechanical oscillographs. However, the electro-mechanical oscillographs are much more convenient for the purpose of rapidly providing continuous permanent records of the unknown signal.

Accordingly, it is another object of this invention to provide a system which is capable of improving the effective sensitivity and response rate of electro-mechanical oscillographs as well as of cathode ray oscilloscopes.

The system of the present invention relies upon the principle of rapid sampling of instantaneous values of the unknown signal to be displayed. The system of this invention may thus be characterized as a sampling oscillograph system. Sampling oscillograph systems have been known prior to the advent of the present invention. Such a system is described in the November 1957 issue of the "Review of Scientific Instruments" (vol. 28, No. 11) starting at page 933 in an article entitled "Sampling Oscilloscopes for Statistically Varying Pulses" by Robert Sugarman. However, the system described in that article has a number of serious limitations and disadvantages.

Accordingly, it is another object of the present invention to provide a sampling oscillograph system having a much higher sampling rate than has been previously obtained.

Another object of the present invention is to provide a sampling oscillograph system in which the rate of sampling is sufficiently high so that substantially no observable discontinuities are permitted to remain between the samples in the resultant display trace.

Another object of the invention is to provide a sampling oscillograph system in which the employment of a delay line for the signal can be avoided to thus avoid distortion and attenuation.

Another object of the invention is to provide a sampling oscillograph system in which distortion of the trace by horizontal displacement of successive sample spots (jitter) can be substantially avoided.

It is another object of this invention to provide a sampling oscillograph system which is particularly characterized by greater simplicity and economy in construction, servicing and operation.

In carrying out the objects of this invention, in one preferred embodiment thereof, a system is employed in which a voltage which bears a definite frequency relationship to a signal to be displayed is fed to a phase sweep circuit which continuously supplies an angle modulated output to a short pulse generator which generates short recurrent pulses in response thereto. The modulation frequency is within the normal frequency range of the oscillograph. The signal to be displayed and the output from the pulse generator are both fed to a coincidence circuit which is operative upon coincidence of both inputs to deliver a sample signal to an oscillograph to be displayed thereby.

As used in this specification, angle modulation is defined as modulation in which the angle of a sine-wave carrier is the characteristic subject to variation. Phase and frequency modulation are particular forms of angle modulation. As will appear from the following, the present invention may be carried out with the employment of either frequency modulation or phase modulation.

Further objects and advantages of the invention will be apparent from the following description and the accompanying drawings which are listed as follows:

Figure 2 is a voltage wave shape diagram illustrating the principle of operation of the sampling oscilloscope system.

Figure 1:
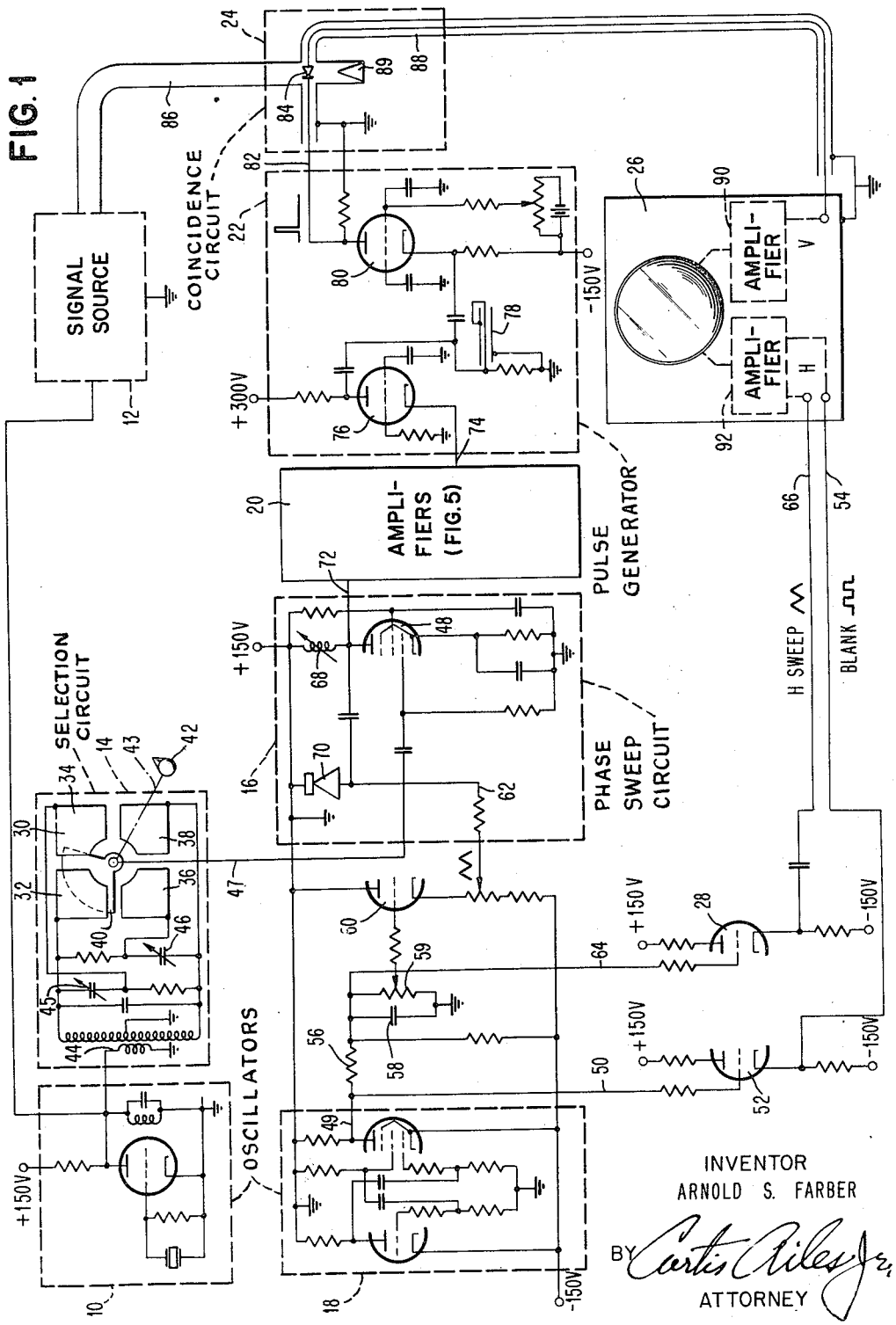
Figure 1 is a schematic circuit diagram of a preferred form of the invention which is adapted for display of signals having predetermined frequencies.

Referring in more detail to the embodiment of the system in Figure 1 there is shown a crystal oscillator circuit 10 which is arranged to have its output connected to control or synchronize the frequency of the signal to be displayed from an unknown signal source 12. The output from the crystal oscillator circuit 10 is also supplied through a static display selection circuit 14 to a phase sweep circuit 16. A multivibrator oscillator 18 is arranged to supply a voltage of low frequency to the phase sweep circuit 16 and to cause a continual change or modulation of the output from the phase sweep circuit 16, such modulation occurring at the frequency of the multivibrator oscillator. As indicated above, the modulation is preferably angle modulation (either phase or frequency modulation). The output from the phase sweep circuit 16 is amplified and shaped, and multiplied (if necessary) in the units indicated schematically at 20. The resultant output is employed in the pulse shaper or pulse generator 22 to provide a very short sampling or commutating pulse output.

The signal to be displayed from source 12, and the sample pulse from the pulse shaper 22 are combined in a coincidence circuit 24 so that upon the occurrence of a sample pulse, a sample of the voltage signal from the signal source 12 is supplied from the coincidence circuit to an oscillograph 26, where all of the rapidly recurring samples are displayed together upon the screen of the oscillograph to provide the desired display of the unknown signal.

The low frequency voltage from oscillator 18 is also supplied through a cathode follower amplifier 28 to the oscillograph 26 in order to provide a horizontal sweep signal.

In operation, it will be appreciated that the actual rate at which samples are taken and supplied to the oscillograph 26 is dependent upon the high frequency signal from the crystal oscillator 10, one sample being taken for each cycle of the input frequency to the pulse shaper 22. However, without the modulating voltage supplied from the low frequency oscillator 18 to the phase sweep circuit 16, the same identical spot or portion of the unknown signal would be displayed for each successive sample pulse. This would not provide a meaningful display upon the oscillograph. But with the low frequency phase sweep modulation voltage which is supplied by the oscillator 18 to the phase sweep circuit 16, the result is that each successive sample "picture" which is taken of the unknown, to display a successive spot upon the oscillograph, is shifted in phase with respect to the unknown and thus displays a different part of the unknown signal. This results in a meaningful display of the signal. It will be appreciated that since the phase displacement which causes the shift in the portion of the signal which is sampled upon each successive sampling operation is determined by the oscillations from the low frequency oscillator, the actual rate of change in the varying positions of successive spots corresponds to the low frequency from oscillator 18. Also, as previously explained, the horizontal sweep is derived from the low frequency oscillator 18. It is clear therefore that the oscillograph 26 is required to have only enough frequency sensitivity to provide a good display of low frequencies in the order of those from oscillator 18. However, the remarkable result achieved by this invention is that an accurate trace is obtained of the high frequency signal which is "looked at" by means of the collection of successive samples.

It has been found that a truly remarkable extension in the effective frequency range of a given oscillograph is possible by means of the present invention. For instance, with a cathode ray oscilloscope having an upper limit in rate of signal response in the order of 350 kilocycles, it has been possible by the employment of the system such as that disclosed in Figure 1 to obtain a display of signals at frequencies as high as 1.5 kilomegacycles. If repeated samples of the unknown signal are available on a relatively unlimited time basis, it is possible with the sampling procedures of the present invention to obtain an effective improvement in frequency response of the oscillograph which is much higher than indicated above. Furthermore, an important feature of the present invention is that the sampling rate can be of the same order of magnitude as the frequency of the unknown signal to be displayed even when the effective frequency improvement of the system is very high. Therefore, there is often a wide difference between the sampling rate as determined by the high frequency oscillator 10 and the low frequency phase sweep signal from oscillator 18, so that a large number of samples are taken in the formation of each trace. This results in a display upon the oscillograph which appears to be perfectly continuous because the samples are so numerous that they merge into a single trace. For instance, with a sampling frequency of 30 megacycles and a horizontal sweep frequency of one kilocycle, there will be 30,000 sample spots per trace. As will be described more fully below, approximately half of these samples will be blanked out by the blanking circuit, but this still permits a total of 15,000 samples to remain.

The wave shape diagram of Figure 2 illustrates graphically the principle of operation of the sampling oscillograph system of the present invention. Curves A through E represent successive recurring cycles of the signal which is to be displayed. As indicated, from each cycle a single sample voltage value is taken, and all of these samples are combined in curve F to form the actual composite display of the signal. For purposes of clarity, only a few sample points have been shown in Figure 2. As explained above, the number of samples may typically run into the thousands, so that the individual samples appear to merge as one continuous trace.

Figure 4:
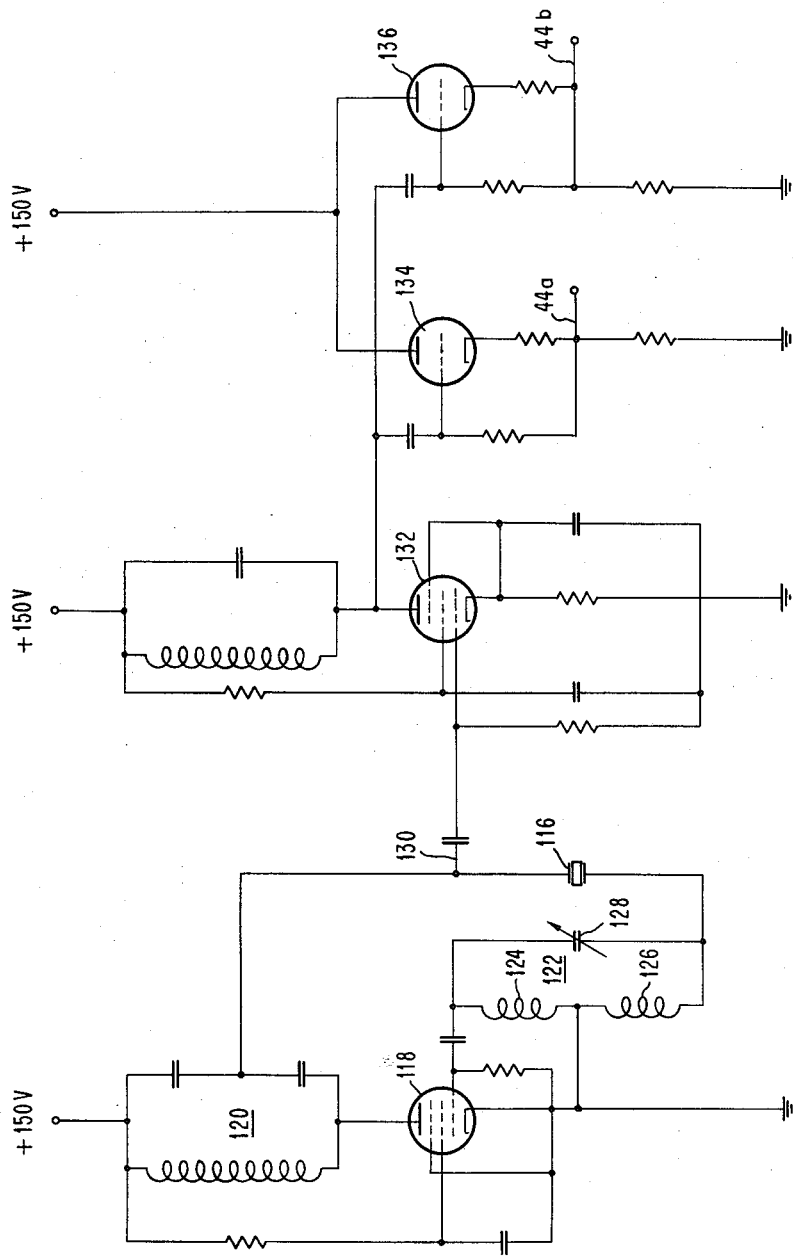
Figure 4 is a schematic wiring diagram showing the details of a preferred crystal oscillator circuit for use in the system of Figure 1.

A more detailed description of the system disclosed in Figure 1 is as follows. The particular circuit employed in the crystal oscillator 10 is not critical as any crystal oscillator circuit will have sufficient stability for operation with the present invention. Accordingly, a very simple standard crystal oscillator circuit is shown at 10. A more elaborate crystal oscillator circuit which may be employed with the system of Fig. 1 is shown in Figure 4 and is described fully below in connection with that figure.

The static display selection circuit 14 employs a phase shifting capacitor structure 30 having four independent stator plates 32, 34, 36 and 38, and rotor segment 40, the position of which is adjustable through manual dial 42 having a shaft connection to the rotor 40 schematically indicated at 43. The signals upon the plates 32 and 38 are separated by 180 degrees in phase because these plates are connected to opposite ends of the secondary winding of the input coupling transformer 44. The plates 34 and 36 are impressed with voltage signals displaced at angles intermediate to the voltages upon plates 32 and 38 by reason of connections to the respective phase shifting networks including the adjustable capacitors 45 and 46. Adjustment of the rotor 40 through the dial 42 therefore permits a shift in the phase of the high frequency signal which is supplied from the crystal oscillator 10 to the phase sweep circuit 16. Since this phase shift adjustment in the display selection circuit 14 ultimately results in a phase shift of the sample pulses, but does not cause any shift in the phase of the signal from the unknown signal source, the result is an adjustment in the portion of the unknown which is actually displayed upon the oscillograph 26. The phase adjusted high frequency signal is supplied through connection 47 to the control grid of the electron device 48 of the phase sweep circuit 16.

The oscillator 18 is essentially a conventional multivibrator which need not be described in detail. The output at 49 from this multivibrator is supplied through a connection 50 and a cathode follower amplifier valve 52 to provide an essentially square wave blanking signal at connection 54 to the oscillograph 26. Also, the signal from the multivibrator 18 is modified by an integrator network including resistor 56 and capacitor 58 to provide a saw tooth wave form. This wave form is supplied through potentiometer 59 for amplification in the cathode follower amplifier valve 60 and transmitted through a connection 62 to the phase sweep circuit 16. This sawtooth waveform signal is also supplied through a connection 64 and a cathode follower amplifier 28 and connection 66 to provide the horizontal sweep on the oscillograph 26 as previously described.

The phase sweep circuit 16 includes a resonant tuned circuit in which the principal components are an adjustable inductance 68 and a voltage variable capacitance 70. This resonant circuit is essentially tuned to the high frequency input which is derived from the crystal oscillator 10 and fed to the control grid of valve 48 through connection 47. However, the voltage bias upon the voltage variable capacitor 70 is varied by the sawtooth low frequency signal applied through connection 62. The resultant variations in the capacity of the capacitor 70 cause variations in the tuning of the circuit with the result that the output from the phase sweep circuit 16 appearing at the output connection 72 is phase modulated at the frequency of oscillator 18.

By means of the adjustment of gain control potentiometer 59 the input to amplifier 60 may be varied and the resultant variation in the low frequency input to the phase sweep circuit 16 permits adjustment in the degree of phase sweep accomplished. The degree of phase sweep in turn determines the relative width of the sample of the unknown which is displayed in total upon the oscilloscope screen.

The voltage variable capacitor 70 is a semiconductor silicon P-N junction device which is available commercially from several sources including Pacific Semiconductors, Inc. of Culver City, California. Because it is essentially a semiconductor diode it is illustrated in the drawing as a diode rather than as a capacitor.

While the voltage variable capacitor phase sweep circuit as illustrated is preferred in the system of the present invention because of its simplicity, it is entirely possible and practical to obtain suitable phase modulation of the high frequency signal by the low frequency signal by the employment of other known standard circuits and devices such as, for instance, a reactance tube, or a saturable reactor. As previously indicated, it is only necessary that some form of angle modulation be obtained. It may be phase modulation or frequency modulation or some combination of the two. Accordingly, many other known modulating systems may be alternatively employed.

The signal from the phase sweep circuit 16 is supplied through the connection 72 to the amplifier circuits indicated by the box at 20. The amplifier circuits 20 may include a number of stages of conventional amplification and a preferred form is illustrated and described in more detail below in connection with Figure 5. In addition to amplification, the circuits of 20 may also accomplish a limiting function and a frequency multiplication function. The frequency multiplication is desirable particularly where the unknown signal source also causes a multiplication of frequencies. In the system illustrated in Figure 5, the frequency is multiplied by a factor of six in the amplifier circuits 20. The amplified signal is then supplied through connection 74 to the pulse shaper 22.

The pulse shaper 22, as disclosed, is intended to handle input frequencies in the order of thirty megacycles and for this purpose employs a valve 76 which preferably is a "lighthouse" triode having low cathode to plate capacitance, high transconductance, and high power output. As indicated, the grid is grounded and the signal is supplied to the cathode from connection 74. A short length of coaxial cable 78 is connected in the load circuit from the anode of valve 76. And the end of the coaxial cable 78 is shorted to provide a reflection signal which determines the pulse length of the output. The resultant pulse signal is then applied to the following amplifier stage including valve 80 which is preferably a "pencil" triode amplifier biased beyond cutoff to further shorten the pulse and to reduce oscillatory signal components. The stage including valve 80 is again driven through the cathode and the output at the anode is fed through a connection 82 to the coaxial line input to the coincidence circuit 24.

Within the coincidence circuit 24, a very short sampling pulse is thereby supplied to the cathode of diode 84 which is located within a waveguide 86 at the junction of the waveguide 86 with the coaxial input to the coincidence circuit. The unknown signal to be displayed is supplied through the waveguide 86 to the junction, and the combined signal is delivered through the coaxial line 88 to the oscillograph 26. The lower end of the waveguide 86, below the junction, is provided with a matched termination 89 to avoid signal reflections.

The diode coincidence circuit 24 in effect places the unknown signal coming in on waveguide 86, and the pulse coming in on connection 82, in series. The short pulse is therefore simply superimposed on the unknown signal. However, the oscillograph 26, and the internal vertical sweep amplifier 90 within oscillograph 26 are unresponsive to signal rates of change as high as the unknown signal, so that in effect these components form a low pass filter which recognizes only the rate of change between the combined signals upon the recurrence of successive samples. As explained previously above, this rate of change occurs essentially at a rate corresponding to the frequency of the low frequency oscillator 18. Such rates of change are well within the capability of the oscillograph 26 and the internal vertical amplifier 90. A similar low frequency amplifier 92 is provided for horizontal sweep in the cathode ray oscilloscope 26. These amplifiers and other features of the oscilloscope 26 are not shown in detail since they are of standard commercial construction.

As mentioned above, it is possible with the system of the present invention to employ a standard electro-mechanical oscillograph in place of the oscilloscope indicated at 26. In such an oscillograph, including a mechanical horizontal recording paper drive mechanism, it is unnecessary to provide the horizontal sweep and blanking circuits including valves 28 and 52. Similarly, it is possible alternatively to employ cathode ray oscilloscopes which have various different frequency response characteristics. The main requirement in this connection is that the multivibrator oscillator 18, which determines the rate of change between successive samples, must be adjusted to oscillate at a frequency which is within the frequency response range of the particular oscillograph employed.

It is one of the most important features of this invention that the oscillograph itself need not have unusual frequency response characteristics. For instance, with low frequency of approximately 1000 cycles per second from the oscillator 18, and with a high frequency from the crystal oscillator in the order of five megacycles which is multiplied in the amplifier 20 by a factor of six, it is possible to form an excellent display of 500 megacycle wave supplied through the waveguide 86 upon an oscilloscope having an upper frequency limit in the order of 100 kilocycles. Such oscilloscopes are very commonly available. For instance, this range of frequencies is within the capabilities of the Dumont Model 208B oscilloscope, an excellent instrument which has been commonly available for a number of years. Even better results with higher frequencies of response can be obtained with oscillographs having higher inherent frequency sensitivities. Such an improved instrument is typified, for instance, by the Model 535 Tektronix oscilloscope, manufactured by Tektronix, Inc. of Portland, Oregon. The Tektronix 535 oscilloscope may be employed with the "high-gain low-frequency" plug in arrangement when used with the system of the present invention.

With the system of Figure 1, it is possible to display information from an unknown signal of a frequency in the order of ten kilomegacycles when amplitude modulated with a 500 megacycle frequency. In such instances, since this system is incapable of displaying the ten kilomegacycles, it in effect acts as a demodulator and forms a display of the 500 megacycle envelope frequency. Furthermore, as discussed more fully below in connection with Figure 7, it is possible to insert a phase demodulator in waveguide 86 which will detect differing phase relationships of the carrier frequency within each successive pulse of the 500 megacycle envelope. When such an arrangement is employed, it is possible to display positive pulses on the oscillograph to indicate one phase of the carrier within a particular envelope loop and a negative pulse display for a displaced carrier phase within successive envelope loops. Accordingly, it is possible, for instance, to store digital information within successive envelope loops of the carrier and to interpret that information from the display on the face of the oscilloscope.

Figure 3:
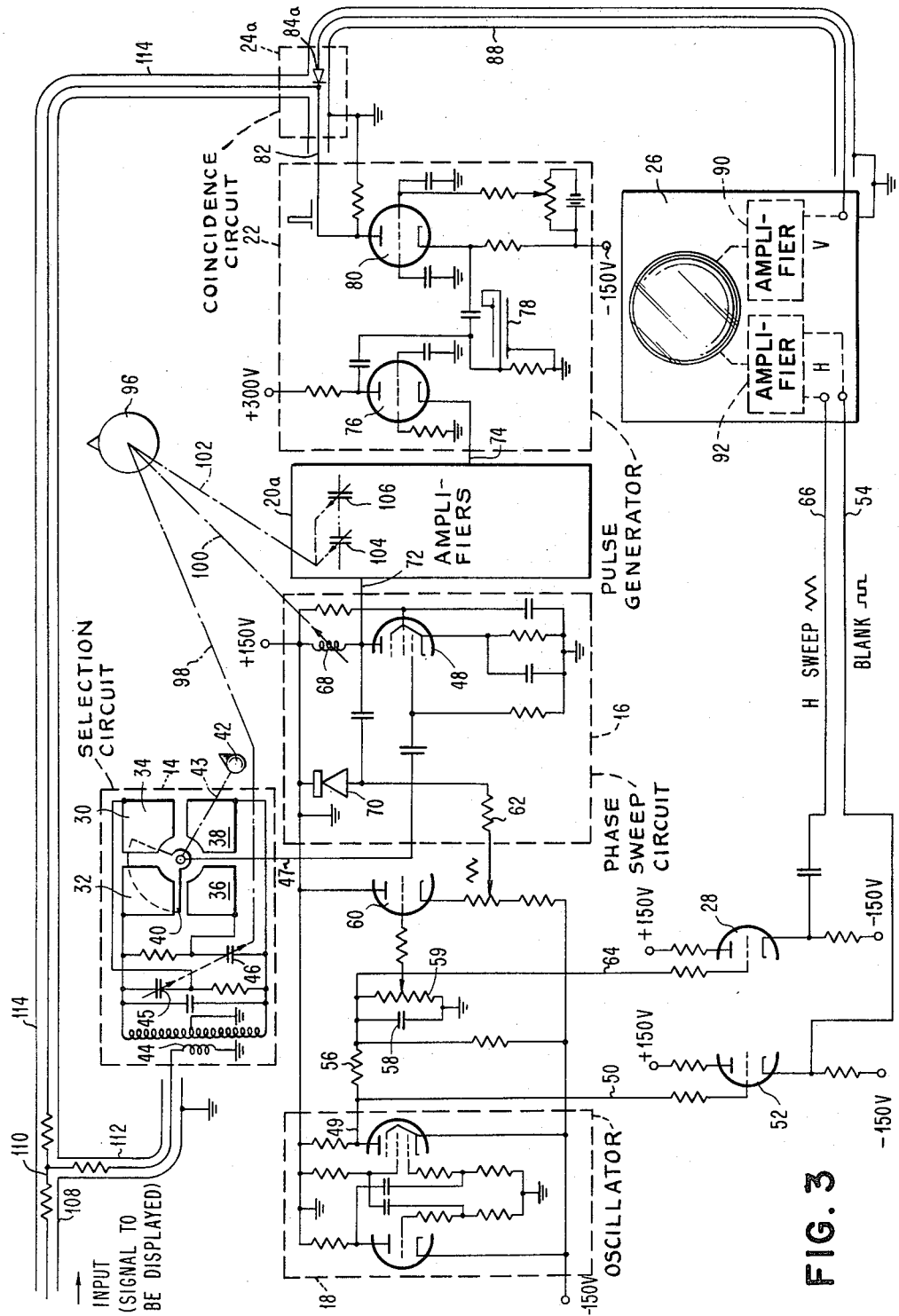
Figure 3 is a schematic circuit diagram of an alternative preferred form of the invention which is adapted for the display of a signal having a frequency within a known frequency range.

The system of Figure 1 is intended essentially as a constant frequency system having a number of tuned circuits which are adjusted or tuned for response to frequencies corresponding to those supplied by the high frequency crystal oscillator 10. However, a more general form of the invention is shown in Figure 3 in which the various circuits within the system which must be tuned to synchronize with the input frequency are ganged for such tuning from a manual dial 96. Shaft connections from the tuning dial 96 indicated schematically at 98, 100, and 102 are required to provide suitable tuning adjustments to capacitors 45 and 46 in the display selection circuit 14, to the variable inductor 68 in phase sweep circuit 16, and for variable capacitors 104 and 106 for two tuned stages within the amplifier circuits 20a.

Further, in the system of Figure 3, instead of employing a local high frequency oscillator, the unknown repetitive signal to be displayed is fed in from an external source upon the coaxial input cable 108. This signal is divided in a conventional coaxial power divider 110 to supply a portion of the input signal to the sample pulse system through coaxial cable branch 112, and to supply the remainder of the signal through branch 114 to a suitable diode coincidence circuit 24a is a coaxial coincidence circuit employing a diode 84a which is similar to the diode 84 of Figure 1. As in the system of Figure 1, the coincidence circuit combines the unknown signal and the sample pulses to supply the combined signal to the vertical oscillograph input line 88. In all other respects, the system of Figure 3 is essentially the same as that of Figure 1. One important additional difference, however, is that the amplifier circuits 20a do not include any frequency multipliers as in circuits 20. In the present invention the sampling rate should not exceed the frequency of the signal to be displayed. But that will occur in the system of Figure 3 if the incipient sampling pulses are multiplied in the amplifiers 20a while the unknown signal is not.

The reason for the above frequency relationship requirement is that the low frequency response oscillograph 26 will serve as an integrator so as to provide an averaging effect between successive sample signals. Accordingly, a sample pulse rate which is higher than the frequency of the unknown will result in successive pulse "pictures" of unrelated portions of the unknown and these values are averaged in the oscilloscope to create a display which does not give an accurate and true picture of the unknown wave. Even in the absence of the averaging effect in the oscilloscope; a sampling rate in excess of the unknown frequency would result in a separate trace for each series of samples. For instance, if there were three times as many samples as there were cycles of the unknown signal, three traces would be displayed. Such a multiple display would be undesirable and confusing.

It is technically feasible, through the use of appropriate commutating circuits (not shown) and an oscilloscope which is fast enough in relation to the unknown frequency to avoid the above mentioned averaging effect, to combine the multiple traces mentioned above into a single trace. This provides a more rapid formation of a complete display through the use of more than one sample per cycle of the unknown. The signals can also be combined to form a single display by use of a cathode ray tube having more than one cathode electron gun. However, the resultant improvement in performance is obtained with a considerable increase in the expense and complexity of the system.

It is apparent from the preceding description that the sample pulses must be synchronized with the frequency of the unknown signal to be displayed. And, the sample pulse rate should be either equal to the frequency of the unknown signal or at a frequency which is a subharmonic of the unknown signal. Each frequency within this classification of acceptable sample frequencies, including the fundamental and subharmonic frequencies of the signal to be displayed is hereinafter identified generically as a "submultiple" frequency of the frequency of the signal to be displayed. This term is appropriate because a submultiple is defined as a number or quantity that divides another exactly (without any remainder).

Within the above defined limitations it is desirable that the sampling rate should be high in order to provide a complete and uninterrupted display in which the samples are numerous enough to avoid discontinuities. However, upon occasion, significant advantages may be obtained in the amplification and handling of the incipient sample pulses at lower frequencies. Accordingly, frequency dividers may be incorporated in the sample pulse system of Figure 3 to lower the frequency of the sample pulses. Such a frequency divider is preferably inserted in the input connection 112 ahead of the display selection circuit 14, in order that the phase shifting and sweeping features of circuits 14 and 16 will not be reduced by the frequency division.

In the operation of the system of Figure 3, if the frequency of the signal to be displayed is not known, the tuning dial 96 is adjusted until a maximum signal is obtained. This may be observed on the face of the oscilloscope in terms of a maximum upward shift of the base line of the display of the signal being observed. Of the tuning devices controlled by the dial 96, the devices 45 and 46 which tune the display selection circuit 14 need not be accurately tunable because dial 42 is available for the purpose of selecting the precise display desired, after tuning has taken place. However, the other circuit tuners 68, 104 and 106 must be capable of reasonably accurate tracking in tuning to obtain efficient system operation. If the devices tuned by the dial 96 do not provide a sufficiently wide selection of frequencies, techniques which are well known in the radio art such as alternate plug-in coils may be used to change the frequency bands of the apparatus. The systems of Figures 1 and 3 are preferably constructed with capacitor standoff insulators for the various physical circuit portions. Many of the grounded capacitors shown in the diagram signify this construction.

Within the systems of Figures 1 and 3 the minimum observable signal rise time is limited by the length of the gate pulse. In a system such as that shown in Figure 1, with a pulse length of about $3 \times 10^{-10}$ seconds, a signal rise time of about $3 \times 10^{-10}$ seconds is obtained. The maximum sensitivity is about 1 millivolt of output per microwatt of signal, with a noise level of about two microwatts. Useful sweep speed is about $10^{-10}$ seconds per centimeter. However, the system is capable of even higher performance if desired by adding further refinements such as additional stages of amplification.

In Figure 4 there is shown a more elaborate crystal oscillator circuit which is preferred for use in the system shown in Figure 1. This oscillator circuit is somewhat unusual because the crystal 116 is operated in its series resonant mode rather than in its parallel resonant mode. Associated with the crystal 114 is the main oscillator valve 118. And the crystal 116 and the valve 118 are interconnected by the tuned circuits 120 and 122. Tuned circuit 122, including inductances 124 and 126 and capacitor 128 provides phase inversion. The oscillator output is supplied through a connection 130 and a capacitor coupling to a tuned amplifier stage including valve 132. The amplified oscillator signal is then supplied through isolating cathode followers including valves 134 and 136 to the output lines 44a and 44b. 44a is connected to input transformer 44 of the static phase shift display selection circuit 14 of Figure 1. Output 44b is arranged for connection to the unknown signal source 12 of Figure 1 for synchronizing the unknown signal.

Figure 5:
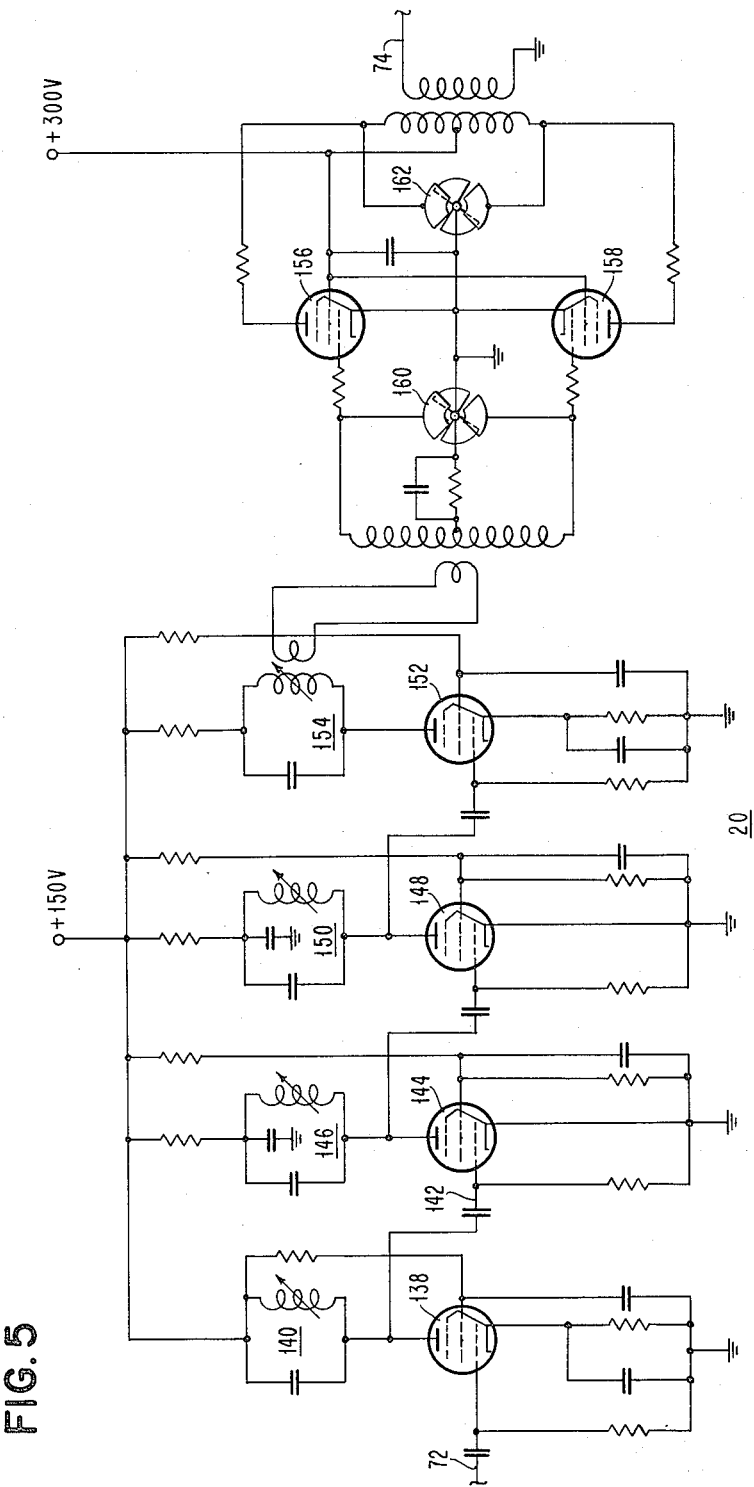
Figure 5 is a schematic circuit diagram of the preferred amplifier units 20 which may be employed in the circuit of Figure 1.

In Figure 5 there is shown a preferred form of the amplifier circuits 20 of Figure 1. These amplifier circuits include a number of tuned multiplier, limiter, and amplifier stages. The first stage, including valve 138 with tuned output circuit 140, is essentially a multiplier stage. The multiplication factor is two and the tuned circuit 140 is therefore resonant at twice the frequency which is applied at the input 72. The doubled frequency is capacitively coupled through a connection 142 to the next stage including valve 144 and tuned circuit 146. This stage is also a multiplier, multiplying the frequency by a factor of three. And the circuit 146 is therefore tuned to a frequency which is 6 times the frequency of the input signal at line 72. The next succeeding stage, including the valve 148 and the tuned circuit 150, is substantially identical to the preceding stage including valve 144. Consequently, no further frequency multiplication occurs in the stage including valve 148. The stages of valves 144 and 148 are operative as limiter circuits.

Following the stage of valve 148 there is connected an amplifier stage including valve 152 having a tuned circuit 154, and then a tuned push-pull amplifier including valves 156 and 158. Butterfly capacitors 160 and 162 are provided in this power amplifier for the purpose of tuning the input and output while maintaining the balance of the two sides of the amplifier. The multiplied limited and amplified signal is thus supplied to the output connection 74 and utilized as previously described in connection with the operation of Figure 1.

Figure 6:
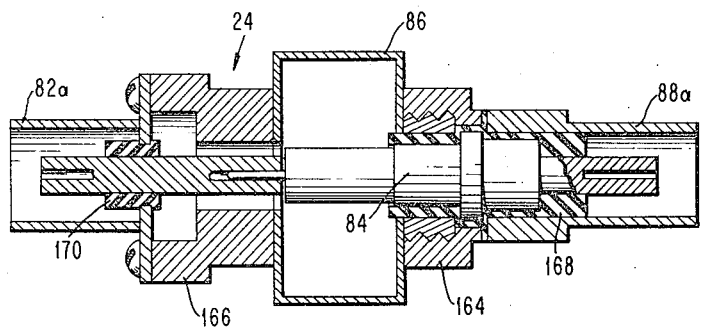
Figure 6 is a sectional detailed view of a preferred form of coincidence circuit 24 which may be employed with the system of Figure 1.

In Figure 6 there is shown a cross-section detail view of the diode coincidence circuit 24. The view is taken through a transverse cross-section of the input waveguide 86 at the center plane of the mounting of diode 84 as shown schematically in Figure 1. The diode is a solid-state microwave device, and the preferred type for the system of Figure 1 is that designated by the number 1N263. The diode is mounted as shown across the waveguide 86 between suitable mounting members 164 and 166 and maintained in an electrically insulated relationship by suitable insulating bushings 168 and 170. The ends of these diode mountings are in the form of coaxial cable connectors to receive the gate pulse (at terminal 82a) and to deliver the coincident signal output (at terminal 88a).

Figure 7:
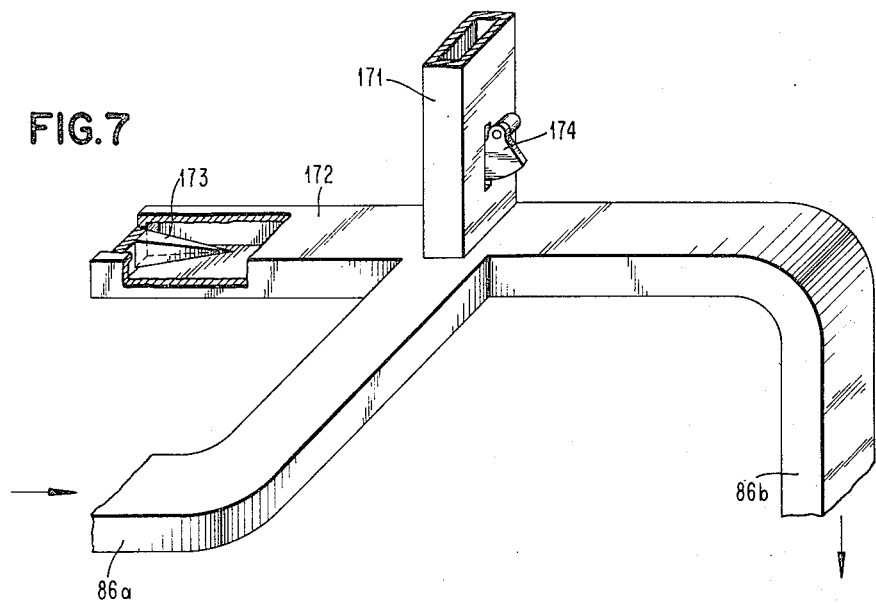
Figure 7 is a schematic diagram of a hybrid junction phase detector system which may be employed in conjunction with the system of Figure 1.

In Figure 7 there is shown a hybrid junction phase detector which may be employed in the system of Figure 1 by insertion in the waveguide 86. The signal from the signal source 12 is applied to the input waveguide 86a and the output from the phase detector appears at output arm 86b which is thus supplied to the coincidence circuit 24 of Figure 1. As explained previously, the phase detector in effect transforms carrier phase information into polarity information. For the purpose of determining the phase relationships of the signals which are supplied at input connection 86a, a continuous reference signal of the carrier frequency is supplied upon the upper arm 171 of the phase detector. The fourth arm 172 is simply terminated in a matched termination 173 to avoid reflections.

The reference signal supplied upon the upper arm 171 is variable in phase in order to provide precisely the required phase relationship to the unknown which is to be phase detected. Also, an adjustable attenuater 174 is provided in this arm to precisely adjust the amplitude of the variable phase signal.

In operation, the phase of the reference signal which is applied upon arm 171 is adjusted with respect to the input signal upon input arm 86a so that the output signals resulting from these two inputs are either exactly in phase so that they reinforce one another, or 180° out of phase so as to oppose one another. With this phase adjustment and with proper amplitude adjustment through the use of attenuater 174, a very precise phase detection is possible and the display upon the oscillograph therefore conveys the information which is carried by the phase of the carrier signal from the unknown.

While a hybrid junction phase detector has been illustrated and described, it will be understood that other phase detection circuits and devices can be employed with the system of the present invention.

A very important feature of the invention is that while the sample pulses recur at a very high frequency, the resultant signals have an actual rate of change at the vertical deflection input connection 88 to the oscillograph which is definitely within the range of the oscillograph 26 and the oscillograph vertical amplifier 90. Accordingly, the unknown signal, as sampled by the system of this invention can be easily and meaningfully amplified by the internal amplifier 90 and displayed by the oscillograph to make use of the full voltage sensitivity of the oscillograph. It should be recognized that while oscillographs have been improved in recent years to respond to higher and higher frequencies, and while such improvements can be expected to continue, the system of the present invention will always provide an effective upward extention in the frequency range of any such oscillograph.

The present invention also provides effective high frequency response without requiring the expense of improved oscilloscopes having upwardly extended inherent frequency response ranges. It is to be noted in this connection that it is possible with the system of the present invention to obtain upon a very inexpensive oscilloscope meaningful displays of unknown signal frequencies which are beyond the inherent capabilities of any known improved oscilloscope used alone. Thus, while, while oscilloscopes are presently known which are capable of displaying signals as high as 100 megacycles with signal amplification, the present invention permits observation of signals in excess of 500 megacycles with signal amplification with a scope which is inherently capable of response to frequencies no higher than 100 kilocycles. Similarly, while oscilloscopes are available presently which will respond to signals as high as 1 kilomegacycle (without amplification), the present system will display signals at frequencies in excess of 1.5 kilomegacycles (with amplification) employing a display oscilloscope which is inherently capable of response at frequencies no higher than 100 kilocycles.

In the preferred forms of the invention shown in Figures 1 and 3, all of the amplifier circuits are essentially tuned circuits. None of the amplifiers are of the class identified as "triggers" such as one pulse multivibrator circuits. This feature is particularly valuable in avoiding "jitter" or side-to-side relative displacement between different portions of the displayed waveform. Because of the inherent time variations in the operation of trigger circuits, such circuits are much more susceptible to problems of "jitter."

Another feature of the invention which presents an important advantage over prior oscillograph display systems intended for use with high frequencies is that by employing the phase shift principle for the purpose of selecting the desired portions of the unknown to be displayed, the necessity for a delay line for the unknown signal is avoided. This is an important consideration because a delay line causes substantial distortion and attenuation in the strength of the unknown signal with resultant degradation in the accuracy and clarity of the display.

Another important advantage of the employment of tuned circuits is the improvement in performance, simplicity and economy achieved by the use of components having limited frequency response ranges.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An oscillograph sampling system for use with an oscillograph having an upper limit in rate of signal response comprising means for receiving a voltage having a predetermined frequency relationship to a regularly recurring voltage to be displayed having rates of change above said upper limit of signal response, said means including tuned circuit means for angle modulating said voltage at a rate below said upper limit of signal response, a short pulse generator means connected to receive said modulated voltage and to generate a short sampling pulse therefrom, and coincidence circuit means arranged to receive the signal to be displayed and connected to receive said sampling pulse and operative upon coincidence thereof to deliver a signal for connection to the oscillograph.

2. A system for use with an oscillograph having an upper limit of frequency response comprising means for receiving a signal to be displayed having a frequency above said upper limit frequency, said means including tuned circuit means for changing the angle of said voltage at a frequency below said upper limit frequency, a short pulse generator means connected to receive said voltage and to generate a sampling pulse therefrom, and coincidence circuit means arranged to receive the signal to be displayed and connected to receive said sampling pulse and operative upon coincidence thereof to deliver a signal for connection to the oscillograph.

3. A system for use with an oscillograph having an upper limit of frequency response, comprising coincidence circuit means arranged to receive a signal to be displayed having a frequency above said upper limit, means for receiving a voltage at a frequency which is a submultiple of the frequency of the signal to be displayed, said means including tuned circuit means for modulating the phase of said submultiple frequency voltage at a frequency below said upper limit frequency, a short pulse generator means connected to receive said modulated voltage and to generate a sample pulse therefrom upon every recurrence thereof, a connection from said pulse generator to said coincidence circuit means, and said coincidence circuit means being operative upon coincidence of said sample pulse and said signal to be displayed to deliver a signal for display upon the oscillograph.

4. A system for use with an oscillograph for displaying a signal above the oscillograph frequency response range comprising means for receiving a voltage at a frequency which has a definite relationship to the frequency of the signal to be displayed, said means including tuned circuit means for angle modulating said voltage at a frequency within the oscillograph frequency response range, a short pulse generator means connected to receive said modulated voltage and to generate sample pulses therefrom, said sample pulses being generated at an average frequency which is a submultiple of the frequency of the signal to be displayed, and coincidence circuit means arranged to receive the signal to be displayed and connected to receive said sample pulses and operative upon coincidence thereof to deliver a signal for the oscillograph.

5. A system for forming a display upon an oscillograph of a signal having a repetition frequency above the response frequency of the oscillograph, comprising a phase sweep circuit connected and arranged to receive a first voltage of a frequency having a predetermined relationship to the frequency of the signal to be displayed, a local oscillator having a frequency within the range of the oscillograph and connected to said phase sweep circuit to modulate the voltage therein, a pulse shaping circuit connected to receive the output from said phase sweep circuit and to provide spaced sample pulses in response thereto, the average frequency of said sample pulses being a submultiple of the frequency of the signal to be displayed, a coincidence circuit connected to receive said sample pulses and arranged to receive the signals to be displayed and operative upon coincidence thereof to supply samples of the signal to be displayed for connection to the oscillograph.

6. A system for forming a display upon an oscillograph of a signal having a repetition frequency above the response frequency of the oscillograph, comprising a phase sweep circuit connected and arranged to receive a first voltage of a frequency having a predetermined relationship to the frequency of the signal to be displayed, said phase sweep circuit being tunable to said first frequency, a local oscillator having a frequency within the range of the oscillograph and connected to said phase sweep circuit to angle modulate the voltage therein by modification of the tuning thereof, a pulse shaping circuit connected to receive the output from said phase sweep circuit and to provide spaced sample pulses in response thereto, the average frequency of said sample pulses being a submultiple of the frequency of the signal to be displayed, a coincidence circuit connected to receive said sample pulses and arranged to receive the signals to be displayed and operative upon coincidence thereof to supply samples of the signal to be displayed for connection to the oscillograph.

7. A system for forming a display upon a cathode ray oscilloscope of a signal having a repetition frequency above the response frequency of the oscilloscope, comprising a phase sweep circuit connected and arranged to receive a voltage of a first frequency having a predetermined relationship to the frequency of the signal to be displayed, said phase sweep circuit being tunable to said first frequency and including a variable reactor as a part of the tuned portion thereof, a local oscillator having a frequency within the range of the oscilloscope and connected to said sweep circuit, said sweep circuit being operable in response to said local oscillator frequency to vary the reactance of said variable reactor to modulate the first frequency voltage therein, pulse shaping circuits connected to receive the modulated output from said phase sweep circuit and to provide spaced sample pulses in response thereto, the average frequency of said sample pulses being a submultiple of the frequency of the signal to be displayed, a coincidence circuit connected to receive said sample pulses and arranged to receive the signals to be displayed to combine said signals with said sample pulses to supply samples of the signal to be displayed for connection to the vertical deflection circuits of the cathode ray oscilloscope.

8. A system for forming a display upon a cathode ray oscilloscope of a signal having a repetition frequency above the response frequency of the oscilloscope, comprising a phase sweep circuit connected and arranged to receive a voltage of a first frequency having a predetermined relationship to the frequency of the signal to be displayed, said phase sweep circuit being tunable to said first frequency and including a voltage variable capacitor as a part of the tuned portion thereof, a local oscillator having a frequency within the range of the oscilloscope and connected to said voltage variable capacitor to modulate the first frequency voltage therein, amplifying and pulse shaping circuits connected to receive the modulated output from said phase sweep circuit and to provide spaced sample pulses in response thereto, the average frequency of said sample pulses being a submultiple of the frequency of the signal to be displayed, a diode coincidence circuit connected to receive said sample pulses and arranged to receive the signals to be displayed to combine said signals with said sample pulses to supply samples of the signal to be displayed for connection to the vertical deflection circuits of the cathode ray oscilloscope, and connections from said local oscillator for supplying horizontal sweep and blanking voltages to the horizontal deflection circuits of the cathode ray oscilloscope.

9. A system for forming a display upon a cathode ray oscilloscope of a modulation signal impressed on a carrier, the modulation signal having a repetition frequency above the response frequency of the oscilloscope, comprising a phase sweep circuit connected and arranged to receive a voltage of a first frequency having a predetermined relationship to the frequency of the signal to be displayed, said phase sweep circuit being tunable to said first frequency and including a voltage variable capacitor as a part of the tuned portion thereof, a local oscillator having a frequency within the range of the oscilloscope and connected to said voltage variable capacitor to modulate the first frequency voltage therein, pulse shaping circuits connected to receive the modulated output from said phase sweep circuit and to provide spaced sample pulses in response thereto, the average frequency of said sample pulses being a submultiple of the frequency of the signal to be displayed, a combined coincidence and demodulation circuit connected to receive said sample pulses and arranged to receive the modulated carrier of which the modulation signal is to be displayed, said coincidence and demodulating circuit being effective to demodulate said carrier and to combine said sample pulses with the resultant demodulated signal to supply samples of the signal to be displayed for connection to the vertical deflection circuits of the cathode ray oscilloscope.

10. In an oscillograph system, a cathode ray oscilloscope having an upper frequency limit of response, a source of high frequency oscillations above said limit, means for connecting said source of high frequency oscillations to control the repetition rate of signals to be displayed from a signal source, a phase sweep circuit connected to receive and transmit oscillations from said high frequency source, a source of low frequency voltage within the frequency range of said oscilloscope, a connection from said low frequency source to said phase sweep circuit for modulating the angle of the transmitted high frequency oscillations in accordance with the low frequency signals, a sampling pulse generator connected to receive said modulated oscillations and arranged to generate a short sampling pulse in response to the reception of each cycle thereof, a coincidence circuit connected to receive the sampling pulse from said pulse generator and arranged to receive the signals to be displayed and operative upon coincidence thereof to transmit a sample of the signal to be displayed, and means for connecting the signal from said coincidence circuit across a pair of the deflection electrodes of said cathode ray oscilloscope for display of the information conveyed thereby.

11. A system for forming a display upon a cathode ray oscilloscope of a signal having a repetition frequency above the response frequency of the oscilloscope comprising a display selection circuit connected and arranged to receive a voltage at a submultiple frequency of the signal to be displayed and operable to vary the phase of said submultiple frequency to shift the display, a phase sweep circuit connected to receive the voltage from said display selection circuit, said phase sweep circuit being tunable to said submultiple frequency and including a voltage variable capacitor as a part of the tuned portion thereof, a local oscillator having a frequency within the range of the oscilloscope and connected to said voltage variable capacitor to modulate the submultiple frequency voltage therein, amplifying and pulse shaping circuits connected to receive the modulated output from said phase sweep circuit and to provide spaced sample pulses in response thereto, a diode coincidence circuit connected to receive said sample pulses and arranged to receive the signals to be displayed and operative upon coincidence thereof to supply samples of the signal to be displayed for connection to the vertical deflection circuits of the cathode ray oscilloscope.

12. A system for forming a display upon a cathode ray oscilloscope of a signal having a repetition frequency above the response frequency of the oscilloscope comprising a display selection circuit connected and arranged to receive the signal to be displayed and operable to vary the phase of the portion of the signal transmitted therethrough to shift the display, a phase sweep circuit connected to receive the signal from said display selection circuit, said phase sweep circuit being tunable to said signal frequency and including a voltage variable capacitor as a part of the tuned portion thereof, a local oscillator having a frequency within the range of the oscilloscope and connected to said voltage variable capacitor to modulate the signal therein, amplifying and pulse shaping circuits connected to receive the modulated output from said phase sweep circuit and to provide spaced sample pulses in response thereto, a diode coincidence circuit connected to receive said sample pulses and arranged for connection to receive the unmodified signals to be displayed and operative upon coincidence thereof to supply samples of the signal to be displayed for connection to the vertical deflection circuits of the cathode ray oscilloscope, and connections from said local oscillator for supplying horizontal sweep and blanking signals to the horizontal deflection circuits of the cathode ray oscilloscope.

13. A system for forming a display upon a cathode ray oscilloscope of a signal having a repetition frequency above the response frequency of the oscilloscope comprising an oscillator for producing a frequency which is a submultiple of the frequency of the signal to be displayed, said oscillator including connections for controlling the frequency of a source of signals to be displayed, a display selection circuit connected to receive said submultiple frequency from said oscillator and operable to vary the phase of said submultiple frequency to shift the display, a phase sweep circuit connected to receive the submultiple frequency from said display selection circuit, said phase sweep circuit being tuned to said submultiple frequency and including a voltage variable capacitor as a part of the tuned portion thereof, a second oscillator having a frequency within the range of the oscilloscope and connected to said voltage variable capacitor to modulate the submultiple frequency therein, amplifying and pulse shaping circuits connected to receive the modulated output from said phase sweep circuit and to provide spaced sample pulses in response thereto, a diode coincidence circuit connected to receive said sample pulses and arranged to receive the signals to be displayed and operative upon coincidence thereof to supply samples of the signal to be displayed for connection to the vertical deflection circuits of the cathode ray oscilloscope, and connections from said second oscillator for supplying horizontal sweep and blanking signals to the horizontal deflection circuits of the cathode ray oscilloscope.

14. A system for forming a display upon an oscillograph of a signal having a repetition frequency above the response frequency of the oscillograph, comprising a phase sweep circuit connected and arranged to receive a first voltage of a frequency synchronized with the frequency of the signal to be display, a local oscillator having a frequency within the range of the oscillograph and connected to said phase sweep circuit to modulate the voltage therein, a pulse shaping circuit connected to receive the output from said phase sweep circuit and to provide spaced sample pulses in response thereto, the average frequency of said sample pulses being a submultiple of the frequency of the signal to be displayed, a coincidence circuit connected to receive said sample pulses and arranged to receive the signals to be displayed and operative upon coincidence thereof to supply samples of the signal to be displayed for connection to the oscillograph.

References Cited in the file of this patent

UNITED STATES PATENTS 2,783,436  Gray et al. _____ Feb. 26, 1957

OTHER REFERENCES

Sugarman: "Sampling Oscilloscope for Statistically Varying Pulses," Review of Scientific Instruments, vol. 28, No. 11, November 1957, pages 933 to 938.